Figure 1:
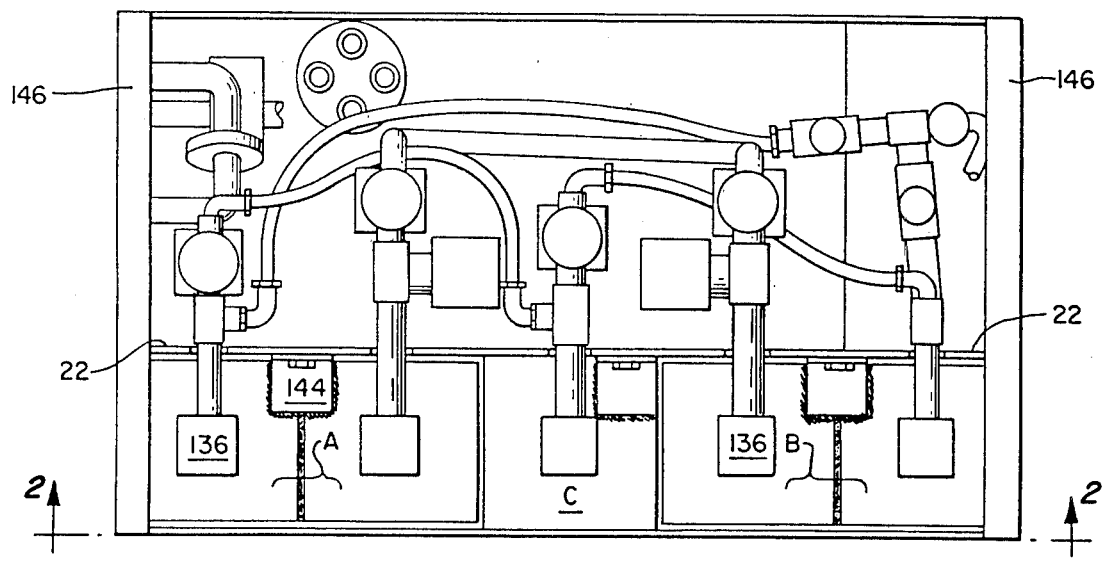

United States Patent [19]

McCombs

[11] 4,371,384
[45] Feb. 1, 1983

[54] BED VESSELS FOR A COMPACT OXYGEN CONCENTRATOR

[75] Inventor: Norman R. McCombs, Tonawanda, N.Y.

[73] Assignee: Greene & Kellogg, Inc., Tonawanda, N.Y.

[21] Appl. No.: 266,867

[22] Filed: May 26, 1981

Related U.S. Application Data

[62] Division of Ser. No. 84,305, Oct. 12, 1979, Pat. No. 4,302,224.

[51] Int. Cl.³ .............................................. B01D 53/04
[52] U.S. Cl. .................................... 55/179; 55/387; 55/DIG. 17
[58] Field of Search ................. 55/179, 180, 316, 387, 55/389, 512, 516, 519, DIG. 17; 210/282, 284, 290

[56] References Cited

U.S. PATENT DOCUMENTS

| | | | |
|---|---|---|---|
| 2,266,031 | 12/1941 | Harman-Ashley | 55/387 |
| 2,579,477 | 12/1951 | Dauphinee | 55/179 X |
| 2,303,332 | 12/1942 | Dauphinee | 55/387 |
| 2,746,845 | 5/1956 | Guild | 55/387 X |
| 2,975,860 | 3/1961 | Westeren | 55/179 |
| 2,979,828 | 4/1961 | Westeren | 55/179 X |
| 3,067,560 | 12/1962 | Parker | 55/387 X |
| 3,384,976 | 5/1968 | Westeren | 55/387 X |
| 3,490,205 | 1/1970 | Hauser | 55/316 X |
| 3,507,621 | 4/1970 | Goodman et al. | 55/512 X |
| 3,731,460 | 5/1973 | Narumi | 55/179 |
| 3,834,130 | 9/1974 | Bissada et al. | 55/387 X |
| 3,849,089 | 11/1974 | Ritter et al. | 55/179 X |

FOREIGN PATENT DOCUMENTS 534938 10/1931 Fed. Rep. of Germany ........ 55/179

Primary Examiner—Robert H. Spitzer
Attorney, Agent, or Firm—Browdy and Neimark

[57] ABSTRACT

Vessels to house the adsorbent beds for a machine for concentrating the oxygen in air for medical purposes, utilizing a pressure swing adsorption (PSA) technique, to provide a lightweight, reliable and compact device especially suited for home use.

5 Claims, 2 Drawing Figures

BED VESSELS FOR A COMPACT OXYGEN CONCENTRATOR

This application is a division of U.S. patent application Ser. No. 84,305, filed Oct. 12, 1979, entitled "Compact Oxygen Concentrator", by Norman R. McCombs, and now U.S. Pat. No. 4,302,224.

This invention pertains to an improved device to house a pressure swing absorption (PSA) cycle to concentrate a selected gas out of a mixture of gases. More in particular, the invention pertains to such a device to concentrate oxygen out of air and to supply such oxygen for medical purposes, such as to people having various respiratory aliments requiring substantially pure oxygen. Heretofore, such users have depended upon cylinders of oxygen in their home, or have used larger and heavier concentrator machines.

The invention particularly concerns the vessels used to house the beds of adsorbent material used in PSA techniques for these and for other applications.

The present invention provides a machine comparable to the prior art machines, which has the improvements of being exceptionally compact and lightweight. Oxygen concentrator machines have well known advantages over tanks of oxygen and machines embodying the present invention retain all of those advantages, and in addition have other advantages over this prior art.

The present invention is not concerned with the PSA cycle per se. It can be used with any such cycle and has the capacity to accept virtually any multi-bed or single-bed system with suitable modifications to the manifolding between the valves and/or changes to the invention vessels for the adsorbent beds. Thus, another advantage of the invention is that it is amenable to use with many different PSA cycles.

The improved compact oxygen concentrator of the parent patent above includes division of its cabinet into a lower warmer compressor space, an upper component space, and a third space which is substantially completely filled by the PSA bed vessels of this invention.

An advantage resides in the particular configuration of these tanks or vessels housing the adsorbent beds, which tanks are strong, while at the same time being of a compact, square or rectangular cross-section design permitting them to be packed densely into their space in the cabinet, again aiding in the obtaining of a relatively small and lightweight unit. Advantageously, the vessels are made primarily from lengths of metal pipe.

Figure 2:
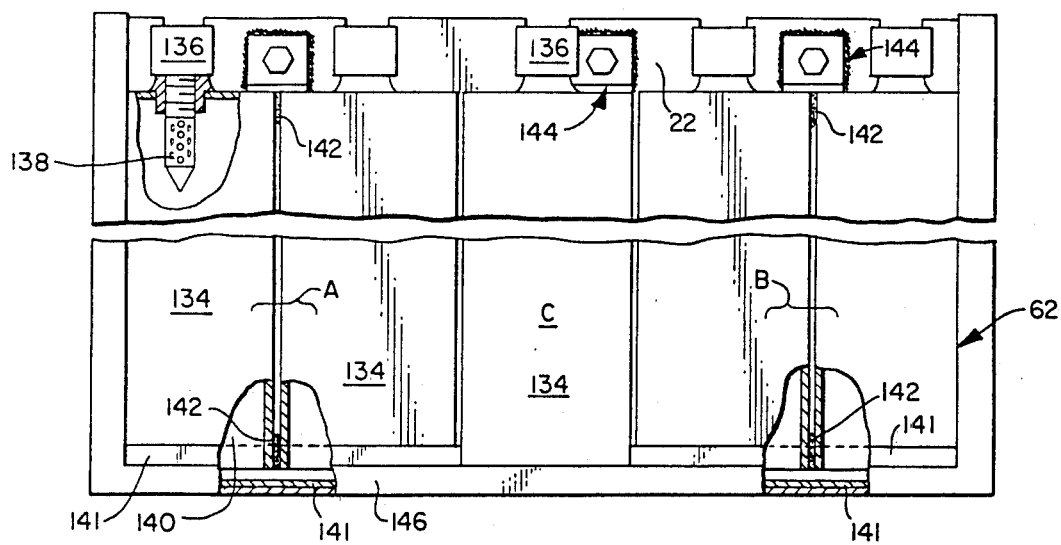

The above and other advantages of the invention will be pointed out or will become evident in the following detailed description and claims, and in the accompanying drawings also forming a part of this disclosure, in which:

FIG. 1 is a top plan view of a compact oxygen concentrator including the invention vessels with the cover removed; and FIG. 2 is a side elevational view showing the vessels housing the adsorbent beds taken on line 2—2 of FIG. 1, with certain parts broken away and in cross-section.

Referring now in detail to the drawings, the parent patent compact oxygen concentrator is shown in which the internal cabinet space is functionally divided into three spaces; a lower cabinet space housing the motor/compressor and other components, an upper cabinet space housing the bulk of the controls, and a full height space housing the adsorbent beds as shown in FIGS. 1 and 2. Reference can be had to the above-identified parent patent for a full showing and explanation of a successful embodiment of a device according to that invention. To the extent said teaching is required to support the claims herein, such teaching is hereby incorporated by reference as if here set forth in full.

The invention is not limited to use with any particular PSA cycle per se. As is described in said parent patent, the then current commercial form of the invention utilized a three bed system, but more or fewer beds, including single bed systems, could also be used with suitable modifications well known to those skilled in these arts.

In the drawings, the three beds 62 utilized in that commercial embodiment of the invention are shown. The invention is aided to achieve its compactness by the use of square cross-section tubing or pipe for the beds or vessels, as well as by the use of a "folded" bed design. For ease of description, the beds will be called A, B, and C, with the A and B beds being the larger folded ones, and bed C being made up of a single length of square cross-section tubing 134. Beds A and B are identical to each other and each comprises two lengths of tubing 134, with access to each end of the folded bed being provided by a fitting 136 which includes a filter or similar commercial device 138 to prevent exit of the adsorbent in the vessels. The bottom ends of the two pieces of square cross-sectional tubing 134 making up beds A and B are indicated by reference numeral 140. The bottom section of the two tubes in each folded bed are secured into a bottom member 141 which permits access therebetween. Member 141 is a sort of rectangular pan and the tubes are sealed by welding thereto (not shown). Welds 142 are provided top and bottom to join each of the pair of tubes 134 together to make each of beds A and B respectively. Tab and bolt arrangements 144 are provided to secure each bed to the vertical wall 22 of the machine housing.

The advantages of this bed design are that extremely strong yet inexpensive tubing is used to make the beds, the beds are extremely compact, there is virtually no waste at all of the bed space in the cabinet, while at the same time a functionally relatively long bed length is provided, which greater length generally is preferred in PSA.

As indicated in the drawings, the two sides, the tops of the front and rear walls and the two sides of the bottom wall are all flanged as shown at 146, the flanges smoothly flowing together all around at their respective areas of juncture. This flanging serves various purposes, including securing the beds against the back side of the vertical wall 22, and as means for locating and securing the cabinet cover.

The drawings also show the "manifolding", the manner of interconnecting the solenoid valves and the like to the fittings 136 on the beds A, B and C in order to interconnect said beds to operate in accordance with the particular PSA cycle in use. These parts and their modus operandi are shown and described in detail in the parent patent.

While the invention has been described in detail above, it is to be understood that this detailed description is by way of example only, and the protection granted is to be limited only within the spirit of the invention and the scope of the following claims.

I claim:

1. A machine for separating a constituent gas out of air using pressure swing adsorption, said machine including air compressor means, at least two closed vessels each containing a bed of adsorbent material, said adsorbent material preferentially adsorbing at least one of the constituent gases in the air, a plurality of solenoid valves being normally closed (no flow), control means for operating said solenoid valves in a cylical manner to achieve alternate adsorption of said at least one constituent gas in and purging of said at least one constituent gas out of said at least two beds of adsorbent material according to a pressure swing adsorption technique, each of said closed vessels comprising a predetermined length of imperforate rectilinear cross-section pipe as its body, means to close the ends of said length of pipe, means to mount said at least two lengths of pipe in a side by side fashion, adsorbent bed material substantially completely filling said vessels, means to permit the flow of gas through said end closing means, whereby said vessels may be arranged in closely spaced relation to each other to thereby permit said machine to be contained in a compact housing, said means to join and permit gas flow comprising a pan-like member at said one end of said at least two pipes with the ends of said pipes terminating short of the base of said pan-like member, whereby gas flow communication can be had between said one of said pipes through the space defined by said pan-like member.

2. The combination of claim 1, said gas flow means comprising filter means joined to said end closing means.

3. The combination of claim 1, said pipe being of square cross-section.

4. The combination of claim 1, at least one said vessel comprising a pair of substantially equal lengths of said pipe, and means joining said pair together longitudinally side-by-side and to permit gas flow communication between said pipes at one end of the joined together pair with one of said gas flow permitting means in each of the end closing means at the other ends of the joined together pair, whereby the functional length of the adsorbent bed in said vessel is substantially equal to twice the length of one of said pipes and the physical length of said vessel is substantially equal to the length of one of said pipes.

5. A machine for separating a constituent gas out of air using pressure swing adsorption, said machine including air compressor means, at least one closed vessel containing a bed of adsorbent material, said adsorbent material preferentially adsorbing at least one of the constituent gases in the air, a plurality of solenoid valves to control gas flows into and out of said at least one vessel, all of said plurality of solenoid valves being normally closed (no flow), control means for operating said solenoid valves in a cyclical manner to achieve alternate adsorption of said at least one constituent gas in and purging of said at least one constituent gas out of said at least one bed of adsorbent material according to a pressure swing adsorption technique, said at least one closed vessel comprising a predetermined length of imperforate square cross-section pipe as its body, means to close the ends of said length of pipe, adsorbent bed material substantially completely filling said vessel, means to permit the flow of gas through said end closing means, said gas flow means comprising filter means joined to said end closing means, whereby a plurality of said vessels may be arranged in closely spaced relation to each other to thereby permit said machine to be contained in a compact housing, said vessel comprising a pair of substantially equal lengths of said pipe, means to join said pair together longitudinally side-by-side and to permit gas flow communication between said pipes at one end of the joined together pair with one of said gas flow permitting means in each of the end closing means at the other ends of the joined together pair, whereby the functional length of the adsorbent bed in said vessel is substantially equal to twice the length of one of said pipes and the physical length of said vessel is substantially equal to the length of one of said pipes, and said means to permit gas flow between said pipes at said one end of the joined together pair comprising a pan-like member sealingly joined to the said one-ends of said pair of pipes, whereby said gas flow communication is via said pan-like member.

* * * * *